(12) United States Patent
East et al.

(10) Patent No.: US 9,280,915 B1
(45) Date of Patent: *Mar. 8, 2016

(54) SPINAL INJECTION TRAINER AND METHODS THEREFOR

(71) Applicants: Johnny Wayne East, Addison Ft Worth, TX (US); Brandon Knutson, Addison, TX (US); Edwin V. East, Jr., Addison, TX (US)

(72) Inventors: Johnny Wayne East, Addison Ft Worth, TX (US); Brandon Knutson, Addison, TX (US); Edwin V. East, Jr., Addison, TX (US)

(73) Assignee: BIOTRAS LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,391

(22) Filed: Jul. 8, 2014

Related U.S. Application Data

(60) Provisional application No. 61/847,564, filed on Jul. 18, 2013.

(51) Int. Cl.
*G09B 23/28* (2006.01)
*G09B 23/30* (2006.01)
*G09B 23/34* (2006.01)

(52) U.S. Cl.
CPC .............. *G09B 23/285* (2013.01); *G09B 23/30* (2013.01); *G09B 23/34* (2013.01)

(58) Field of Classification Search
USPC .......................................... 434/267, 272, 274
See application file for complete search history.

(56) References Cited

U.S. PATENT DOCUMENTS

| 2,207,153 | A | | 7/1940 | Judovich |
| 2,689,415 | A | * | 9/1954 | Haver ........................... 434/272 |
| 6,780,016 | B1 | | 8/2004 | Toly |
| 7,866,984 | B1 | | 1/2011 | Jawalekar |
| 2004/0236425 | A1 | * | 11/2004 | Huang ........................ 623/17.12 |
| 2005/0035282 | A1 | * | 2/2005 | Lehmann et al. .......... 250/252.1 |
| 2005/0106545 | A1 | | 5/2005 | Heruth et al. |
| 2006/0191544 | A1 | | 8/2006 | Simmonds et al. |
| 2007/0290446 | A1 | | 12/2007 | Amick |
| 2009/0142741 | A1 | | 6/2009 | Ault |
| 2010/0311025 | A1 | * | 12/2010 | Everett ......................... 434/262 |
| 2013/0045469 | A1 | * | 2/2013 | Noras ........................... 434/262 |

OTHER PUBLICATIONS

Computer Imaging Reference Systems, Inc. (hereinafter referred as "CIRS"), "Lumbar Training Phantom Model 034", accessed at: http://www.cirsinc.com/products/all/8/lumbar-training-phantom/.*
NASCO (Fort Atkinson) Plastics; Lifeform: Spinal Injection Simulator LF01036U Instruction Manual; NP 161-83/RV 7-15; 6 pages; www.enasco.com.

* cited by examiner

*Primary Examiner* — Xuan Thai
*Assistant Examiner* — James Hull
(74) *Attorney, Agent, or Firm* — Howison & Arnott, LLP

(57) ABSTRACT

For use in training needle techniques such as spinal anesthesia and or lumbar epidural steroid injections, a spinal model includes a complete natural bone vertebral column that is embedded in a matrix of crystal clear ballistic gel. The synthetic gel does not harbor bacteria, can be reused and does not require refrigeration. Natural bone offers significantly better image contrast over radiopaque replicas. A transparent synthetic gel matrix permits observation of needle progression by both the trainee and the trainer and provides unique opportunities for coaching and intercession to prevent poor needle placement prior to its occurrence.

9 Claims, 7 Drawing Sheets

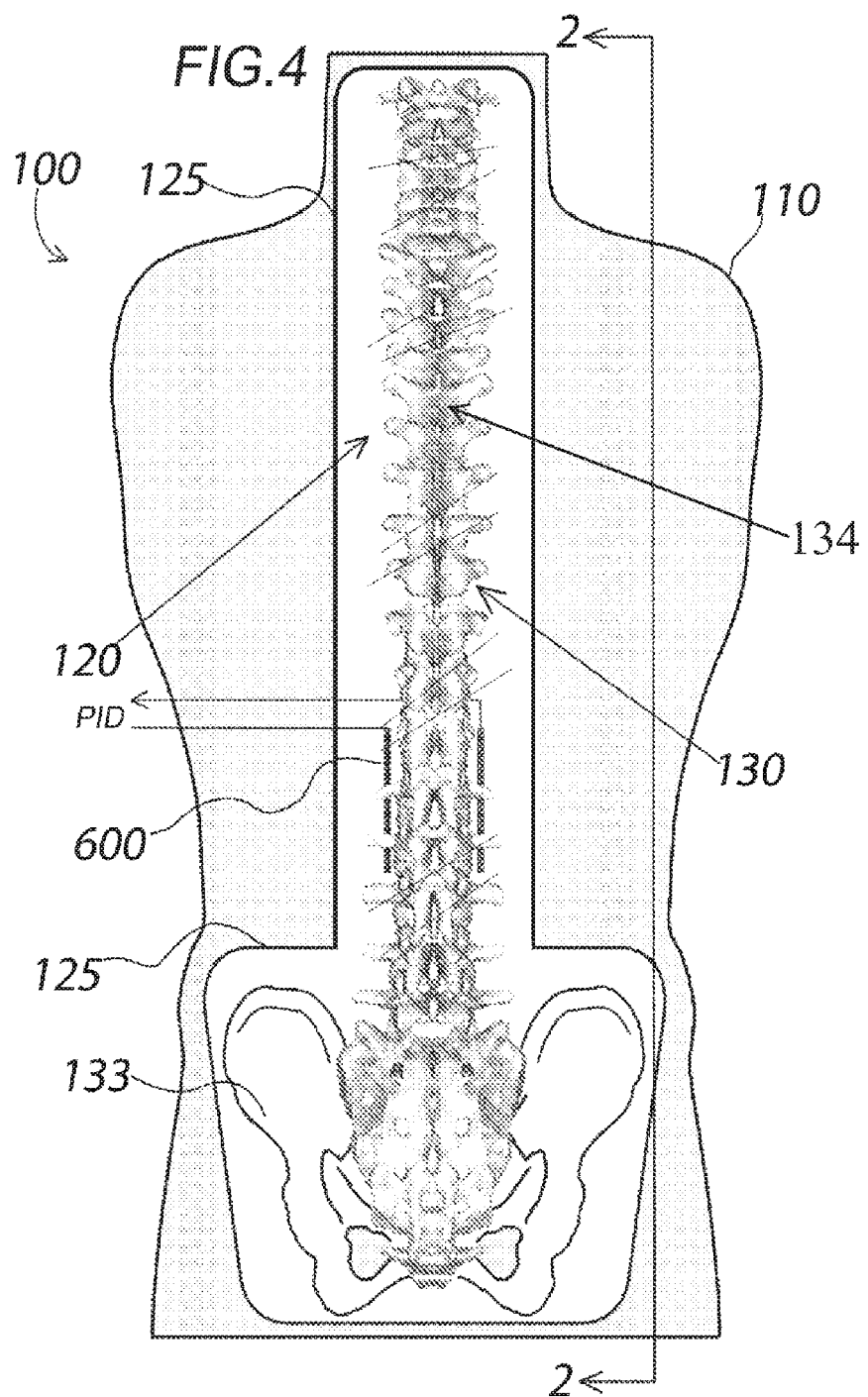

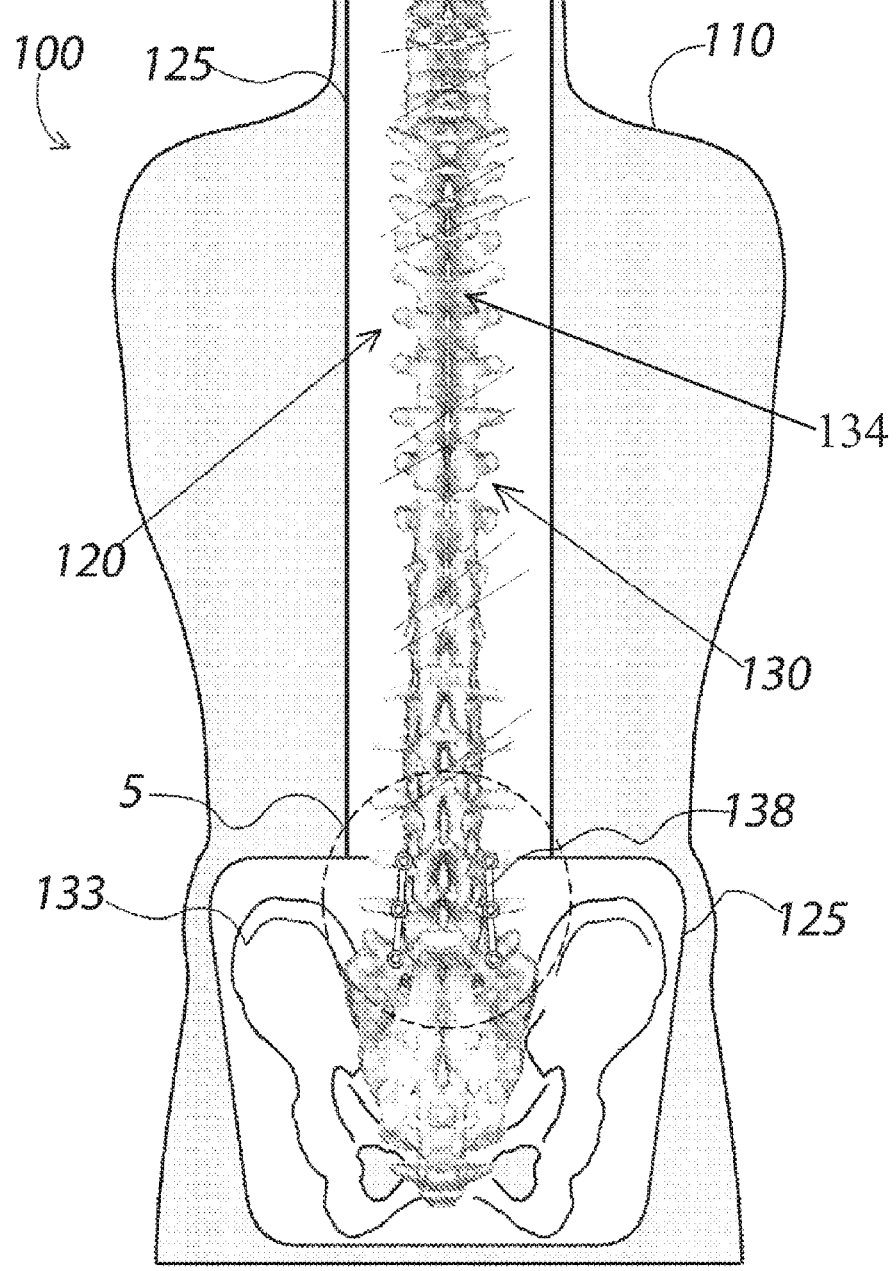

SPINAL INJECTION TRAINER AND METHODS THEREFOR

CROSS-REFERENCE TO RELATED APPLICATIONS

This application claims the benefit of U.S. Provisional Application No. 61/847,564 having a filing date of Jul. 18, 2013, and titled "Spinal Injection Trainer and Methods Therefore."

FIELD

The present invention relates generally to medical training models and more particularly to a model that includes natural vertebrae embedded in a matrix of clear synthetic ballistic gel, and its uses.

BACKGROUND

Spinal models for injection technique practice or training have been described in the past. Computerized Imaging Reference Systems, Inc, Norfolk Va., offers a lumbosacral spine model that includes a radiopaque plastic spinal model embedded in silicone. Other models including natural gelatin based embedded spinal phantoms for ultrasound use have been described; Jia Wei et al. "Gelatin-Agar Lumbosacral Spine Phantom" J Ultrasound Med (2011) 30:263-272, describes an agar-gelatin matrix and Bellingham et al., "A Low-Cost Ultrasound Phantom of the Lumbosacral Spine" Regional Anesthesia and Pain Medicine (2010) vol. 35, no. 3, describes a concentrated gelatin matrix. While the foregoing are no doubt useful for their intended use, neither silicone models nor the described natural gelatin based matrices provide realistic tactile feedback for the trainee.

Natural gelatin is a material obtained from collagen and other animal by-products and is a component in numerous foods and cosmetic products. More particularly, "ballistic" gel is a formulation based on either natural gelatin or a synthetic, which is calibrated to possess ideally, characteristics similar to human muscle tissue, and is used primarily in ballistics testing. One standard calibration of ballistic gel involves firing into it a .177 caliber steel BB, from an air gun, measuring the velocity of the projectile and the depth of penetration. Ballistic gels based on natural gelatin will darken, degrade quickly, and cannot be reused. Because bacterial contamination and decay are a concern, natural gelatin based models must be refrigerated between uses. More recently, synthetic ballistic gels have been formulated to mimic the properties of natural gelatin, but are odorless and colorless, and unlike natural gelatin, can be reused by heating and reforming by melting and re-pouring into a form. Two U.S. companies that make or sell synthetic ballistic gel are Clear Ballistics LLC. P.O Box 723 Fort Smith Ark., 72901, and Ballistek Gel LLC, N8547 North Rd, Ixonia, Wis. 53036. Synthetic ballistic gel is not subject to rapid decay, does not require refrigeration and does not serve as a bacterial reservoir.

Imaging Techniques

While training phantoms employing skeletal replicas are adequate for sonographically guided needle insertion, plain plastic or resin components will not show adequately in either plain x-ray or flouroscopic imaging because they are non-radiopaque. In the case of x-rays, bone appears lighter than the surrounding tissue. In a flouroscope, relatively more x-rays pass through soft tissue to fluoresce a phosphor screen and produce real time moving images wherein the bones appear relatively darker than the surrounding tissue. While some practice models employ plastic vertebrae made of radiopaque resin enabling it to be seen in a flouroscope monitor, the image contrast provided by radiopaque plastic is unlike that of natural bone because of the naturally non-uniform distribution of calcium in bone which selectively absorbs more or less of the x-rays, thereby producing a more dimensional image.

Anatomic Training

While use of cadavers has been declining in U.S. Medical schools primarily due to cost of preparing and maintaining the corpus, anatomists have complained that cadavers are still the best way to teach anatomy because it provides kinesthetic reinforcement as opposed to computerized models. Although anatomical teaching models are better now than in the past, a common material used to simulate tissue, silicone, although superior to other less resilient plastics, still does not provide the tactility of human tissue.

Both silicone "tissue" of costly training models and the relatively inexpensive gelatin based phantoms break down with repeated punctures rendering them unfit for training. At some point, accumulated needle tracks will interfere with both light transmission, clarity and disturb the intended path and placement of subsequent needles. It would be desirable to provide a teaching model for the human spine that provides realistic tactile feedback of the vertebral column and surrounding tissue. It would be further desirable if such a model were suitable for flouroscopically guided spinal injection techniques. In addition to being reusable and requiring no refrigeration, the foregoing model should produce an image that reflects actual bone contour, and be transparent so that needle path and placement can be observed or practiced with or without the use of a imaging techniques such as flouroscopy or sonography.

SUMMARY

The present invention seeks to address the shortcomings of past spinal training models by providing a spinal model that includes a complete natural bone vertebral column that is embedded in a matrix of crystal clear ballistic gel. The synthetic gel does not harbor bacteria, can be reused and does not require refrigeration. Natural bone offers significantly better image contrast over radiopaque replicas. More dimensional, i.e., contoured image contrast is obtainable with natural bone which is obtained via cadavers or antique teaching skeletons. For use in training needle techniques such as spinal anesthesia and or lumbar epidural steroid injections, a transparent synthetic gel matrix permits observation of needle progression by both the trainee and the trainer and provides unique opportunities for coaching and intercession to prevent poor needle placement prior to its occurrence. Because the matrix closely simulates the feel of human tissue, for purposes of anatomy instruction, a flexible opaque sheet of a self-healing material such as closed cell polyurethane foam or similar material, preferably having a thickness between 2 and 10 mm, is placed over the model so that the structures and regions of the spine can be taught, and later independently discerned, without benefit of visual reinforcement.

In one aspect of the instant invention, a model possessing a vertebral column of natural bone embedded in a clear matrix of ballistic gel is clearly visible inside the gel, and therefore suitable for injection practice with or without flouroscopic imaging.

Because surgical hardware makes distinguishing spinal structures difficult as it can mask or distort adjacent regions, in an aspect of the instant invention, a vertebral column advantageously includes surgical hardware such as brackets and threaded fasteners so clinicians can develop the ability to better visualize on a monitor spinal anatomy with surgical hardware in place.

In yet another aspect of the present invention, a thin opaque cover simulating tactile properties of human skin is provided to enable blind injection practice or palpation of vertebral structures such as the spinous processes.

In still another aspect of the present invention, areas between vertebrae may include a foam disk surrounded by a silicone layer that permits a needle to be placed into the disc space.

In whatever aspect, the model of the instant invention may include needle track mitigation using heat or focused energy to produce localized heating of matrix regions in order to effectively fuse or reabsorb needle tracks. One preferred embodiment includes a pair of cartridge heaters, at least one on each side of that region of the vertebral column affected by needle practice. The cartridge heaters are preferably controlled by a PID controller that can maintain a programmed temperature to within −0.5 to +0.5 degrees Celsius. PID control permits more stable temperature range management than other types of temperature control such as on/off control, or proportional control. Suitable PID controllers for the invention include, but are not limited to auto-tune type controllers such as the EZ-ZONE PM Temperature Controller Series from Watlow Inc. 12001 Lackland Rd. St. Louis, Mo. USA 63146, that provide for adaptive temperature sensing and learning, whereby the controller initially probes a material to determine its thermal properties which are then employed in the controller's PID algorithm. When it is desired that the needle tracks be erased, the controller can be set to cycle to a desired temperature that is where the synthetic gel matrix starts to transition to a flowable state, whereby the tracks are fused closed, and the cartridge heaters powered off.

Other possible uses combining the disclosed aspects and features of the present invention will suggest themselves to those having skill in the art and benefit of this disclosure.

The foregoing and other objects, features, and advantages of the invention will become more apparent from the following detailed description, which proceeds with reference to the accompanying figures.

BRIEF DESCRIPTION OF THE DRAWINGS

FIG. 4 is a plan view showing placement of cartridge heaters adjacent the spine;

FIG. 5 is a plan view of one embodiment according to the present invention having surgical hardware on the spine.

DETAILED DESCRIPTION OF THE INVENTION

Figure 1:
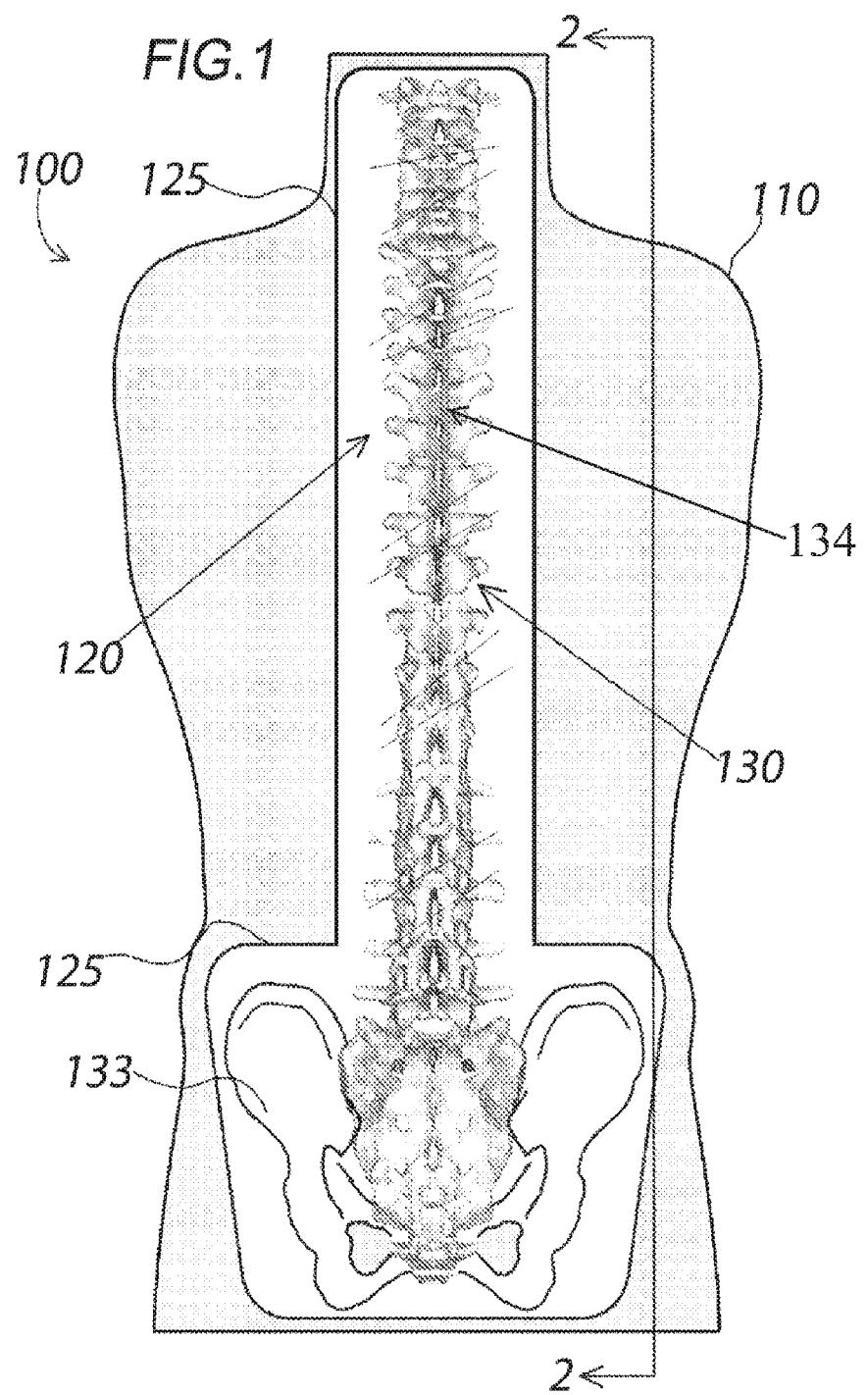
FIG. 1 is a plan view of a preferred embodiment according to the present invention.

Reference Listing 100 spinal model
110 form
112 insert
120 synthetic gel matrix
121 gel matrix contour
125 aperture
130 vertebral column
131 spinous process
132 intervertebral disc
133 pelvic bone
134 spinal cord
136 spinal nerve
138 surgical hardware
140 foam vertebral disc
200 sheet
300 needle
600 localized heating means Definitions Unless otherwise explained, any technical or medical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." Publications, patent applications, patents, and other references mentioned herein, if any, are incorporated by reference in their entirety for all purposes. In case of conflict, the present specification, including explanations of terms, will control. In addition, the materials, methods, and examples are illustrative only and not intended to be limiting.

Referring generally to FIGS. 1-6, a spinal injection training model 100 including a form 110 containing a gel matrix 120 into which a complete vertebral column of natural bone 130 with simulated associated soft vertebral tissue structures 132, 134, 136 has been embedded. The matrix is a transparent synthetic ballistic gel having a density and feel substantially like that of human tissue in order to provide realistic haptic feedback upon needle 300 insertion and placement techniques, and spinal palpation practice which can be performed with opaque sheet 200 (FIG. 6) positioned on or off the top surface of the model, and which is preferably of a silicone or other elastomer resembling the texture of human skin.

Referring to FIG. 1, a plan view of a preferred embodiment according to the present invention shows form 110 containing matrix 120 with a complete vertebral column 130 embedded therein. The form has an opening 125 that exposes a top surface of the gel matrix for needle practice. Preferably, the vertebral column is obtained from cadaverous specimens, or from antique skeletal models. The vertebrae are first cleaned and treated with a sealant that is non-reactive with the petroleum based matrix and placed in a contoured form (mold) with the spinous processes 131 pointing down, with the vertebral body facing up. The vertebral column can be secured from shifting by any means that would be appreciated by those skilled in the art and benefit of this disclosure. Because the bottom inside surface of the mold is contoured to resemble the curves of the human back, a uniform distance of about 2 cm will exist between the tops of the spinous process and the mold bottom. A block of synthetic ballistics gel is pieced and placed into the mold void containing the vertebral column which is then heated in an oven to melt and fuse the gel. Once liquified, the matrix is subjected to vibration to raise trapped air to the surface. In this manner, after the gel cools and firms, the top can be trimmed with a knife or wire to remove any bubbles, and finally, the form is inverted so the top of the cast now has the contouring. It is possible, of course to apply a vacuum for degassing the matrix to draw out trapped air preferably prior to pouring the matrix, or prior to curing.

Figure 2:
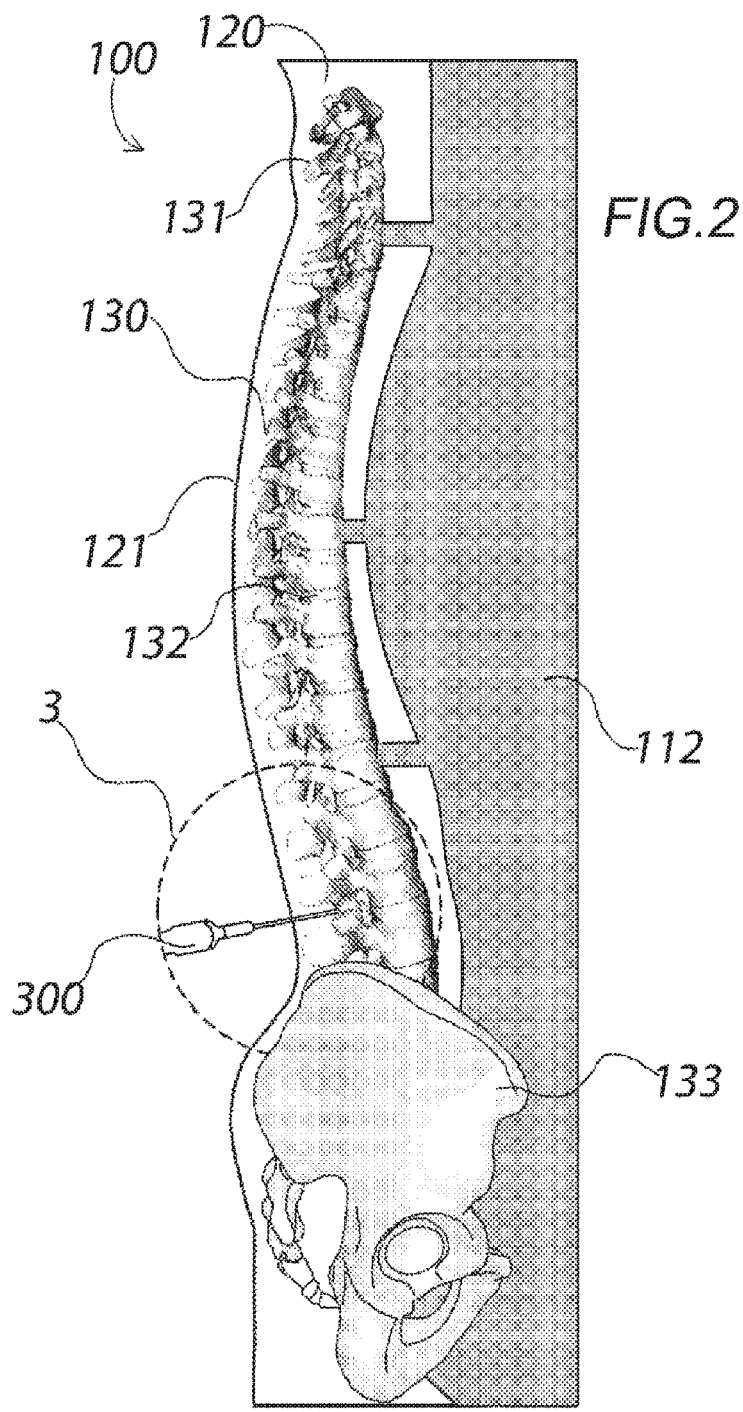
FIG. 2 is a cross-sectional view taken along lines 2-2 of the embodiment shown in (FIG. 1) showing a needle insertion.
Figure 3:
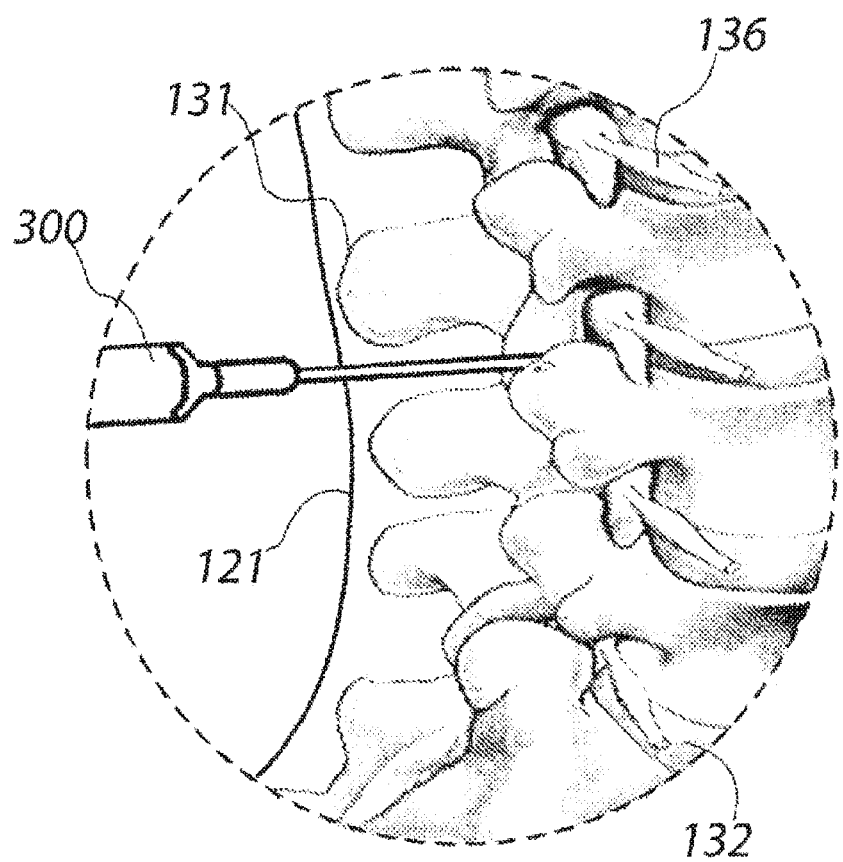
FIG. 3 is a detail view showing a needle insertion.

FIG. 1 is a top plan view of the model having a torso shape. As can be seen in FIG. 2, the contour of the exposed portion 121 of the gel matrix corresponds to the typical contours of a human back and follows the spinous process 131. FIG. 3 is a detail view of needle being inserted into the lumbar region of the spine surrounded by transparent gel so that injection technique can be observed form any direction. Also depicted are synthetic spinal nerves 136 which can be made of silicone or other suitable pliant material. While the embodiments shown herein depict a torso shape, in cases where the spinal column is embedded in a rectangular slab, the sides of the enclosure or shell, can be a rigid material such as acrylic to facilitate transporting the model when necessary.

Figure 3A:
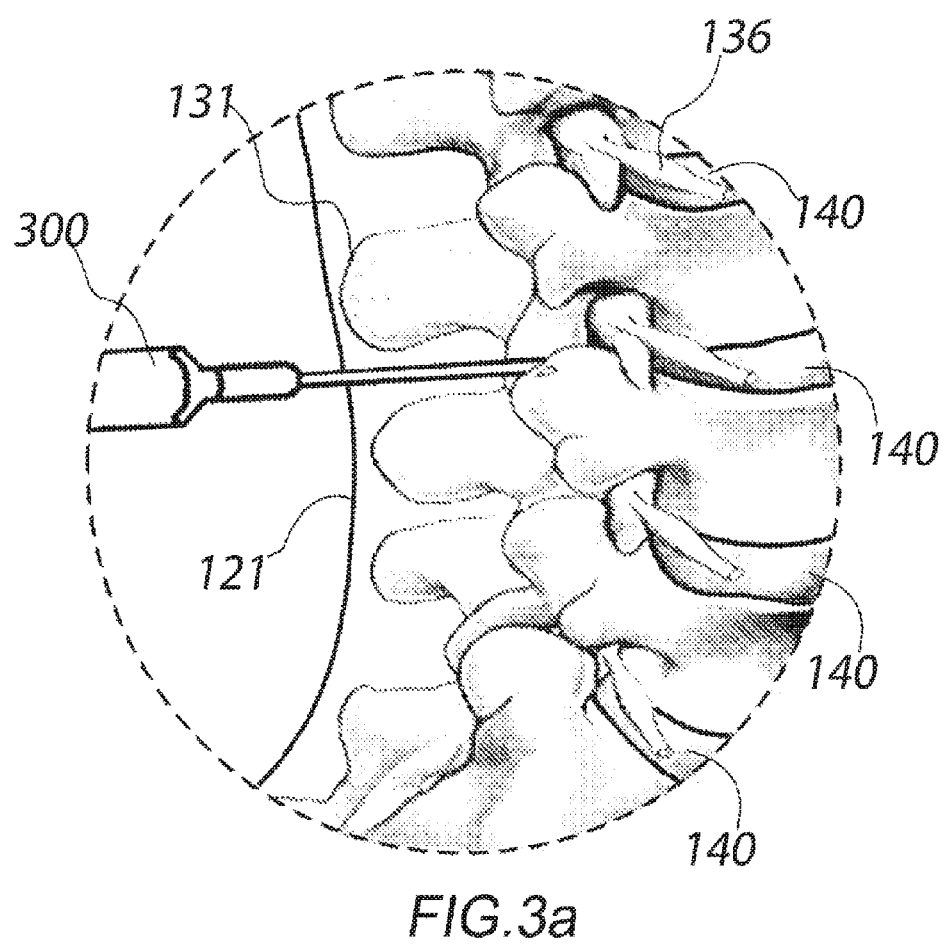
FIG. 3a is a detail view of a segment of spinal column showing a foam disk between vertebrae.

FIGS. 3 and 3a show respectively, needle insertion between vertebrae, and the section of vertebral column with artificial foam discs. The discs 140 can be made of foam urethane, silicone, or other suitable material that simulates the density of a human vertebral disc. Preferably, the foam disc has a silicone layer at each end. The foam disc may alternately be embedded in a silicone or urethane of a different density.

FIG. 4 is a plan view of the spinal model of the invention in which cartridge heaters 600 have been placed just adjacent to the spinal region where needle practice occurs. The cartridge heaters are preferably controlled by a PID controller so that the cartridge heater temperature will not exceed the melting point of the synthetic gel matrix. It is possible to raise the temperature to a point at which the needle tracks fuse and are reabsorbed into the transparent matrix.

FIG. 5 is a plan view of a model having surgical hardware installed on the embedded vertebral column. Because the vertebral column is natural bone, the contrast produced during a flouroscopically guided procedure will realistically simulate that of an actual in vivo procedure.

Figure 6:
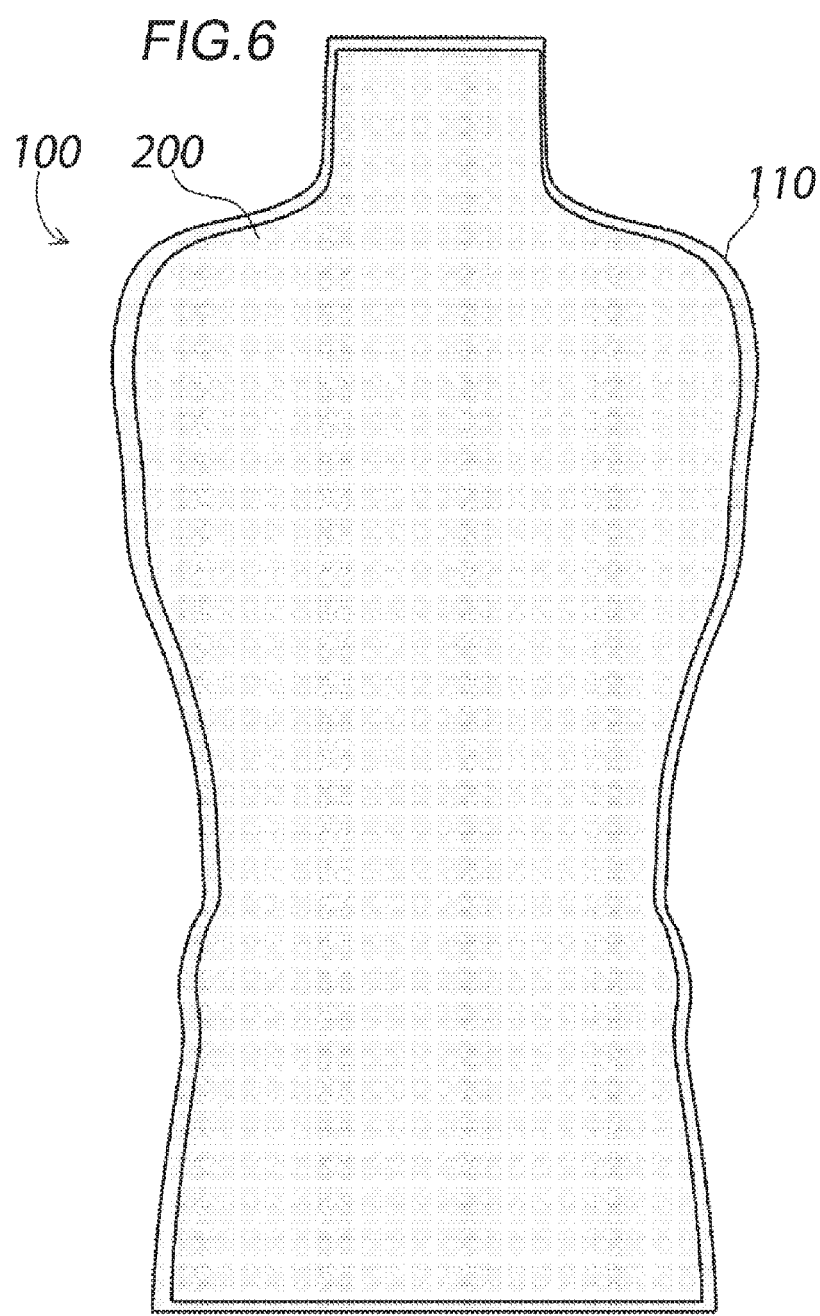
FIG. 6 shows the embodiment of (FIG. 1) with a sheet placed over the contoured form.

FIG. 6 is a plan view of a model according to the present invention with an opaque sheet sized and shaped, and of a thickness that simulates skin. Palpation and discernment of the spinous process 131 can be performed "blind" to simulate a clinical setting.

The model of the present invention can be supplied in various sizes corresponding to different body types including obese body types, in which case the tissue possesses a relatively greater thickness over the spinous process. This is particularly useful in chiropractic training.

In view of the many possible embodiments to which the principles of the disclosed invention may be applied, it should be recognized that the illustrated embodiments are only preferred examples of the invention and should not be taken as limiting the scope of the invention. Therefore, this disclosure is intended to cover such alternatives, modifications, and equivalents as may be included in the spirit and scope of the description in view of the appended drawings and claims.

We claim:

1. A model for anatomic training and spinal injection practice, comprising:
   (1) a form having contoured portions simulating a partial torso,
   (2) within the form, a visibly clear, thermally fusible, synthetic ballistic gel matrix providing tactile feedback substantially similar to that of human tissue, the synthetic ballistic gel providing visible needle tracks extending through the synthetic gel matrix along the path of the needle upon insertion at a point on the contoured surface to a target below the contoured surface, at least a portion of the needle tracks extending along the path remaining visible until the needle tracks are fused closed with a heat source, whereby the needle tracks are fused closed upon heating the synthetic gel matrix such that the needle tracks are no longer visible in the synthetic gel matrix;
   (3) embedded in the matrix, a flouroscopically visible vertebral column with or without surgical hardware, and wherein vertebrae are interposed with synthetic intervertebral discs, at least a portion of the vertebral column producing a fluoroscopic image representative of the structure of human bone, and
   (4) the vertebral column including at least one synthetic simulated soft tissue structure, not producing a fluoroscope image with an image contrast representative of human bone.

2. The model according to claim 1 further comprising human bones, wherein the human bones comprise at least a portion of the flouroscopically visible vertebral column.

3. The model according to claim 1, wherein the model provides realistic contrast and contouring of hard and soft tissues when fluoroscopically imaged.

4. The model according to claim 1, further comprising a synthetic spinal cord.

5. The model according to claim 1, further comprising a flexible opaque removable sheet of a material simulating the tactile qualities of human skin.

6. The model according to claim 1, further comprising a heater, embedded in the model, the heater providing heat to a localized area within the model to fuse visible needle tracks closed such that the needle tracks are not visible after heating.

7. The model according to claim 1 further comprising at least a pelvic bone.

8. The model according to claim 1 further comprising foam intervertebral discs.

9. A method for spinal injection practice comprising the steps of:
   providing a vertebral column, at least a portion of the vertebral column comprising natural bone,
   providing at least one synthetic simulated soft tissue structure, the at least one synthetic simulated soft tissue structure not producing a fluoroscope image with an image contrast representative of human bone;
   embedding the vertebral column in a transparent, thermally fusible synthetic ballistic gel matrix simulating the contours of a region of a human back, which upon palpation or needle insertion provides tactile feedback substantially similar to that of human tissue to a clinician, the synthetic ballistic gel providing visible needle tracks extending through the synthetic gel matrix along the path of the needle upon insertion at a point on the contoured surface to a target below the contoured surface, at least a portion of the needle tracks extending along the path remaining visible until the needle tracks are fused closed with a heat source, whereby the needle tracks are fused closed upon heating the synthetic gel matrix such that the needle tracks are no longer visible in the synthetic gel matrix and,
   observing or guiding a path of needle insertion into the matrix directly or indirectly via fluoroscopic or other imaging modalities that produce images with realistic contrast and contouring of hard and soft tissues.

* * * * *